US007988172B2

(12) United States Patent
Richter et al.

(10) Patent No.: US 7,988,172 B2

(45) Date of Patent: Aug. 2, 2011

(54) POWER-SUPPLEMENTED MANUAL HEIGHT-ADJUSTING WHEELCHAIR

(75) Inventors: William Mark Richter, Nashville, TN (US); Russell Rodriguez, Nashville, TN (US); Adam Paul Karpinski, Nashville, TN (US)

(73) Assignee: Max Mobility, LLC, Nashville, TX (US)

( * ) Notice: Subject to any disclaimer, the term of this patent is extended or adjusted under 35 U.S.C. 154(b) by 398 days.

(21) Appl. No.: 12/335,719

(22) Filed: Dec. 16, 2008

(65) Prior Publication Data

US 2010/0148466 A1 Jun. 17, 2010

(51) Int. Cl.
*B62M 1/14* (2006.01)

(52) U.S. Cl. .................................. 280/250.1; 280/304.1

(58) Field of Classification Search ............... 280/250.1, 280/304.1, 657, 649

See application file for complete search history.

(56) References Cited

U.S. PATENT DOCUMENTS

| | | | | |
|---|---|---|---|---|
| 4,500,102 | A | 2/1985 | Haury et al. | |
| 5,301,964 | A | 4/1994 | Papac | |
| 5,622,406 | A | 4/1997 | Meschkat et al. | |
| 5,669,620 | A * | 9/1997 | Robbins | 280/250.1 |
| 5,884,928 | A | 3/1999 | Papac | |
| 6,250,717 | B1 | 6/2001 | Porcheron | |
| 7,845,665 | B2 * | 12/2010 | Borisoff | 280/250.1 |
| 2003/0116927 | A1 * | 6/2003 | Quigg | 280/5.22 |
| 2003/0184042 | A1 * | 10/2003 | Patrick et al. | 280/250.1 |
| 2004/0183276 | A1 * | 9/2004 | Silva | 280/657 |

* cited by examiner

*Primary Examiner* — Joanne Silbermann
*Assistant Examiner* — Tashiana Adams

(57) ABSTRACT

A wheelchair having a lower frame with drive wheels and forwardly extending arms with casters and an upper frame with a seat and backrest. Linkage assemblies on opposing sides pivotably attach at a first end to the lower frame and at a second end to the upper frame. Power cylinders attached on opposing sides are extendable between the upper frame and the lower frame and are lockable from moving from a selected position. When unlocked, the power cylinders apply a supplemental force in association with a force applied by a user on the drive wheels for moving the upper frame relative to the lower frame guided by the linkage assembly. A method of adjusting the seat height of a wheelchair is disclosed.

29 Claims, 4 Drawing Sheets

POWER-SUPPLEMENTED MANUAL HEIGHT-ADJUSTING WHEELCHAIR

TECHNICAL FIELD

The present invention relates to wheelchairs. More particularly, the present invention relates to height adjusting wheelchairs for selectively positioning a user.

BACKGROUND OF THE INVENTION

Wheelchairs are mobility devices that facilitate engaging in ordinary activities for disabled persons. Wheelchairs enable the persons to engage in ordinary daily activities such as moving around a home, going shopping, traveling, and the like. Conventional wheelchairs comprise tube frame construction having a frame, drive wheels, front castors, and a seating system including seat and back. The seat and back include cushions for seating support and comfort. Lateral positioners and head supports also can attach to the seating system depending upon the particular physical requirements of the individual using the wheelchair.

There is an increased focus on facilitating wheelchair users in ordinary and routine daily activities. This includes, for example access to storage cabinets, tables, and the like, which requires reaching above and below conventional heights. Some wheelchair devices accommodate this by allowing the wheelchair to be set for different heights. The drawback is that changing the height that is set for the wheelchair is often not practical. Yet the conventional and ordinary activities of most persons involve interacting with furniture, cabinets, and articles at differing heights.

Wheelchair construction has previously provided mechanisms to allow changing the seat height of the wheelchair. Generally, these involve mechanisms that vertically displace the seat up or down. Power or hydraulic cylinders operate to move the seat vertically, but may be different to control the particular positioning of the change in height.

While vertically adjustable seat systems enable a wheelchair user to reposition the seating, there are drawbacks to its use. Merely moving the seat vertically upward causes a change in the center of gravity. The wheelchair then tends to be come more tippy. “Tippy” refers to the tendency of the wheelchair to tip rearwardly. It is important generally for independent pushers to configure the wheelchair to be tippy. In such configuration, a substantial majority of the weight carried by the wheelchair is on the rear wheels. This makes the front wheels easier to elevate, for example, for going over curbs, carpeting, grass, or other surfaces. Raising the center of gravity tends to make the wheelchair increasingly tippy.

Accordingly, there is a need in the art for a balanced user-activated stability-compensated height-adjusting seating system on a wheelchair. It is to such that the present invention is directed.

SUMMARY OF THE INVENTION

The present invention meets the need in the art by providing a wheelchair with manual power-supplemented stability-compensated height-adjustable seating, comprising a lower frame to which drive wheels attach and opposing forwardly extending arms to which front casters attach for rolling movement across a surface and an upper frame that includes a seat and backrest for a person to occupy the wheelchair. A pair of linkage assemblies on opposing sides are each pivotably attached at a first end to the lower frame and at a second end to the upper frame. A pair of actuators, each attached at a first end to a rear portion of the upper frame and at an opposing end to a pivot associated with a forward portion of the lower frame, are extendable between a retracted position and an extended position, and lockable from moving from a selected position. The actuator when unlocked applies a supplemental force in association with a force applied by a user in the wheelchair on the drive wheels for moving the upper frame relative to the lower frame guided by the linkage assembly pivoting in response to the applied forces.

In another aspect, the present invention provides a method of moving a stability-compensating height-adjusting seat in a wheelchair having a lower frame to which drive wheels attach and opposing forwardly extending arms to which front casters attach for rolling movement across a surface, an upper frame that includes a seat and backrest for a person to occupy the wheelchair, comprising the steps of:

(a) providing a pair of linkage assemblies on opposing sides, each linkage assembly pivotably attached at a first end to the lower frame and at a second end to the upper frame;

(b) releasing from selected locked position a pair of actuators that extend between a retracted position and an extended position, each actuator attached at a first end to a rear portion of the upper frame and at an opposing end to a pivot associated with a forward portion of the lower frame, the actuators upon release applying a supplemental force between the upper frame and the lower frame; and (c) a user seated in the wheelchair applying a force relative to the drive wheels to move the seat relative to the lower frame in the presence of the supplemental force from the actuators.

Objects, advantages, and features of the present invention will be apparent upon a reading of the following detailed description in conjunction with the drawings and the appended claims.

DETAILED DESCRIPTION

Figure 1:
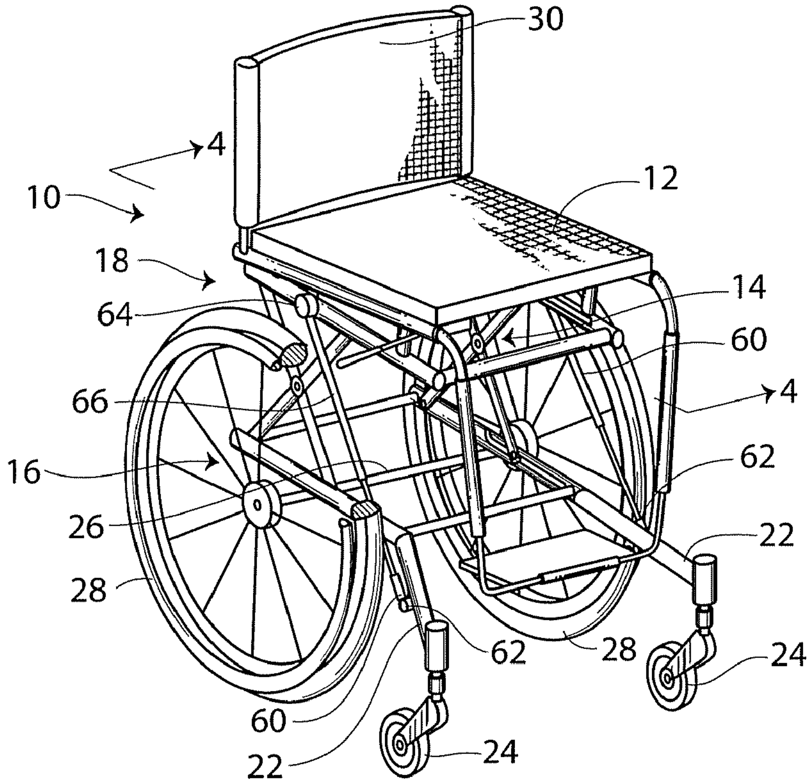
FIG. 1 illustrates a perspective front view of a wheelchair that features a manual, power-supplemented stability-compensated height-adjustable seat according to the present invention.

With reference to the drawings in which like parts have like identifiers, FIG. 1 illustrates a wheelchair 10 with a stability-compensating height-adjustable linkage assembly generally 14 that enables the height of a wheelchair seat 12 to adjust vertically and to a lesser extent horizontally and thereby allow access to objects, furniture, and the like that would otherwise be out of reach to a person occupying the seat of the wheelchair. The wheelchair 10 includes a chassis 15 having lower frame 16 and an upper frame 18 interconnected by the movable linkage assembly 14. As discussed below, the linkage assembly 14 moves so that the vertical and to a lesser extent horizontal position of the seat relative to the lower frame can be changed.

The lower frame 16 in side view includes a pair of lower tracks 20, each on an opposing side and joined together by lateral connecting tubing (best illustrated in FIG. 3 discussed below) to define the rigid lower frame for the wheelchair 10. Each of the lower tracks extends as arm 22 forwardly and downwardly. A castor wheel 24 attaches to the distal end of each arm 22. An axle tube 26 mounts on opposing sides to the lower frame 16. The axle tube 26 conventionally receives a quick release rear wheel 28, or other suitable drive wheel.

The upper frame 18 includes the seat 12, a backrest 30 angling from the seat, and a side member 32. The seat 12 connects to a first portion 33 of the side member 32. The foot plates 34 attach to a second portion 35 that extends downwardly to distal portions thereof. The seat 12 and seat backrest 30 conventionally include upholstered cushions or pads. The seatback 30 conventionally changes its angle relative to the seat 12. A pair of footrest support arms 31 extend from the upper frame and a footrest 33 attaches to distal ends of the support arms.

A pair of the linkage assemblies 14 connects the lower frame 16 and the upper frame 18 on opposing sides. Each linkage assembly 14 includes a scissor jack 36 having a first linkage member 38 and an opposed second linkage member 40. The first linkage member 38 and the second linkage member 40 are disposed in diagonal, crossing relation. The first linkage member 38 pivotably attaches at a first end 42 to a rear portion of the lower frame 16. The first linkage member 38 slideably attaches at an opposing second end 44 to an upper track 46 of the upper frame 18. The second linkage member 40 pivotably attaches at a first end 48 to a rear portion 50 of the upper frame 18. The second linkage member 40 slideably attaches at an opposing second end 52 to a lower track 54 of the lower frame 16. The first linkage member 38 and the second linkage member 40 on each side are pivotally connected at respective intermediate portions 56.

A pair of actuators are provided for moving (or assisting the movement of) the upper frame 18 relative to the lower frame 16, depending on the turning of the actuators and the direction of relative movement, as discussed below. The actuators in the illustrated embodiment are locking gas springs or power cylinders 60 that attach on opposing sides to the respective linkage assemblies 14. Each gas spring 60 attaches at a first end 62 to the arm 22 on the lower frame 16 and attaches at a second end 64 to a portion of the upper frame 18. This disposes the gas spring 60 substantially diagonally relative to the lower frame 16 and the upper frame 18. The force applied by the gas springs has a vertical component and a horizontal component. The locking gas spring 60 has an extendable piston 66 so that the gas spring moves between a retracted position and an extended position. The gas spring is selectively lockable at a selected position. Gas springs suitable for installation and use are available from Easylift of North America Incorporated, Melbourne, Fla.

Figure 2:
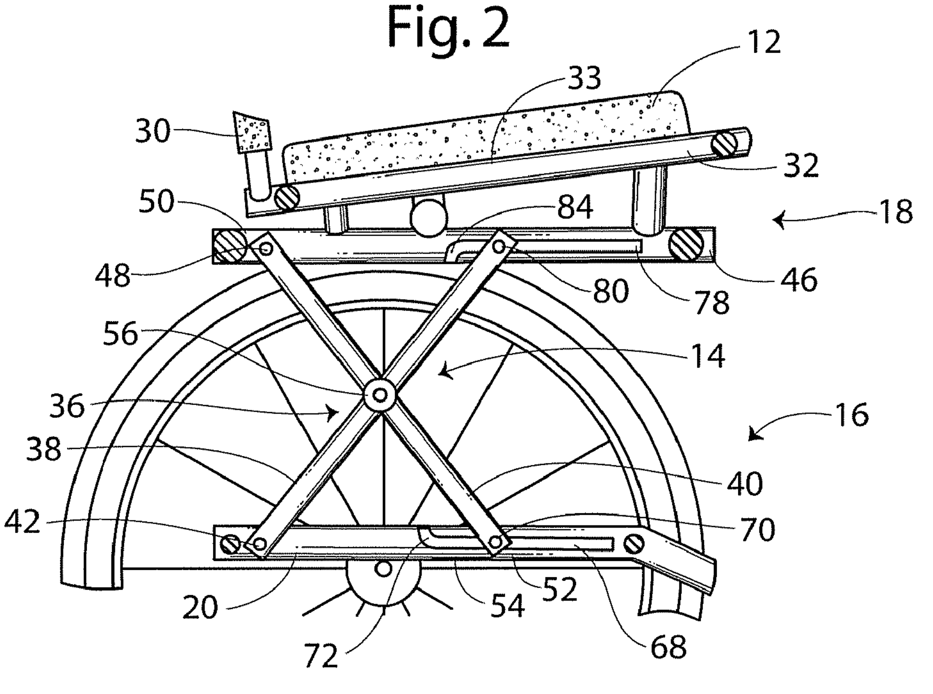
FIG. 2 illustrates a detailed side view of a scissor linkage with guide tracks within the frame of the wheelchair shown in FIG. 1.

FIG. 2 illustrates a detailed side view of the scissor jack 36 that operates pivotably while adjusting the height of the wheelchair seat 12 (and to a lesser extent, the longitudinal or horizontal position of the seat) relative to the lower frame 16. The lower frame 16 includes the lower track 54. The lower track 54 defines a slot 68 in the side tube of the tubular member of the lower frame 16. A pin 70 extends through the second end 52 of the second linkage member 40 and through the slot 68 to a guide 70 disposed within the tube. The guide 70 can be a roller or a smoothly slidable body configured for longitudinal travel within or relative to the lower track 54. The slot 68 has an exit 72 closed by a detachable cap 73. The exit 72 facilitates insertion of the guide within the tube.

The upper frame 18 includes the upper track 46 with a slot 78. A pin 80 extends through the second end 44 of the first linkage member 38 and engages a guide 82 within the tube of the upper frame 18. An exit 84 of the slot 78 facilitates insertion of the guide 82, and is closed by a cap 86.

Figure 3:
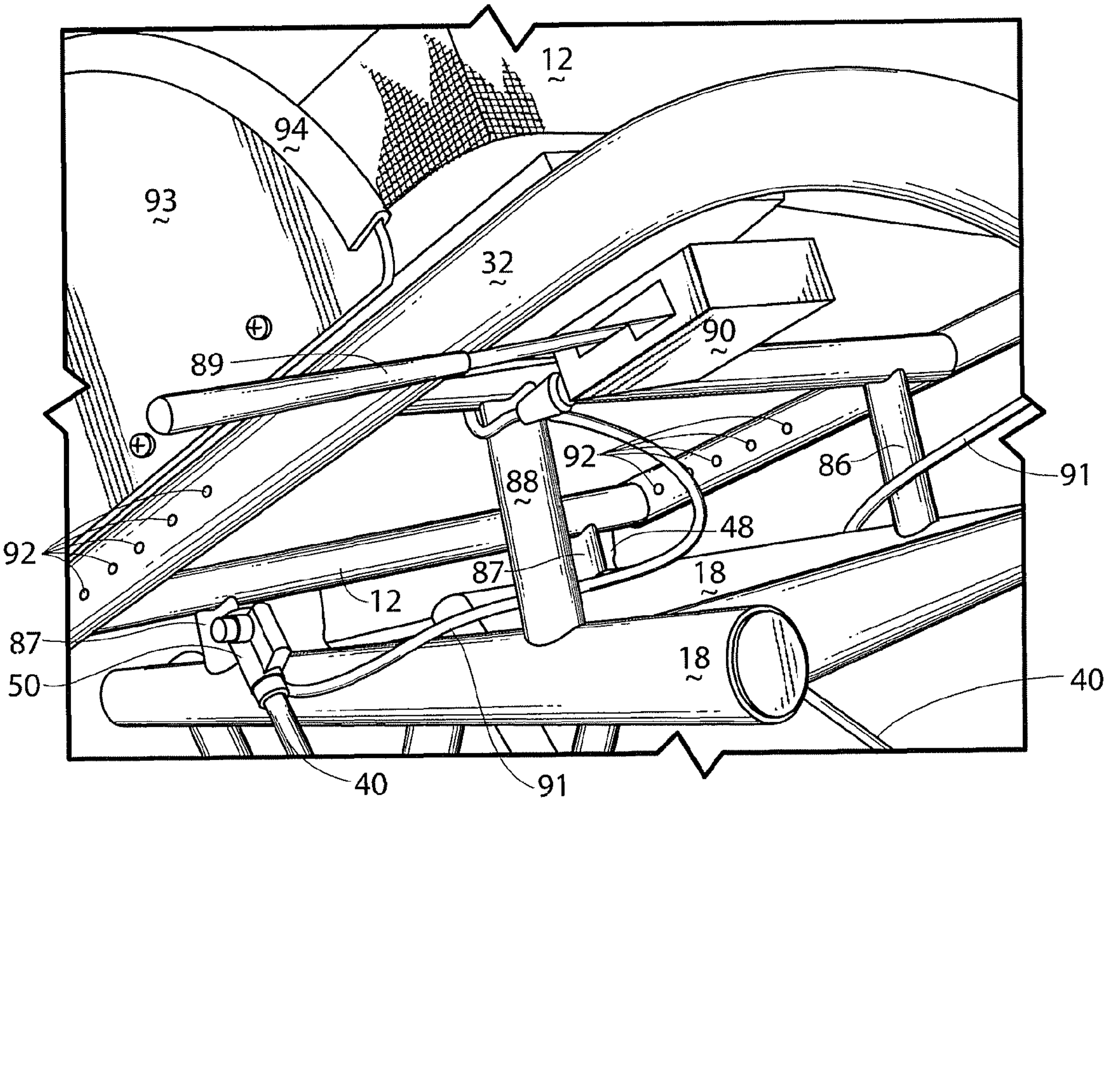
FIG. 3 illustrates a detailed view of the seat with a release lever selectively movable for changing the position of the seat relative to the lower frame of the wheelchair.

FIG. 3 illustrates a side perspective detailed view of the upper frame 18 and the connecting supports 87, 88 between the upper frame and the side member 32. A lever 89 pivotally mounts in a control box 90 attached below the seat 12 to one of the side members 32. The control member 89 moves from a first position in which the gas springs 60 are locked to a second position releasing the gas springs for movement. A control cable 91 connects between the control lever 89 and the respective gas spring 60. The side members 32 include a plurality of spaced-apart openings 92 aligned with the seat 12. The openings 92 receive fasteners for securing the seat 12 in a selected longitudinal forward or rearward position relative to the frame 18. A side wall 93 attaches to a side of the seat 12. The side wall 93 defines an upper edge 94 for an arm rest or other support.

Figure 4:
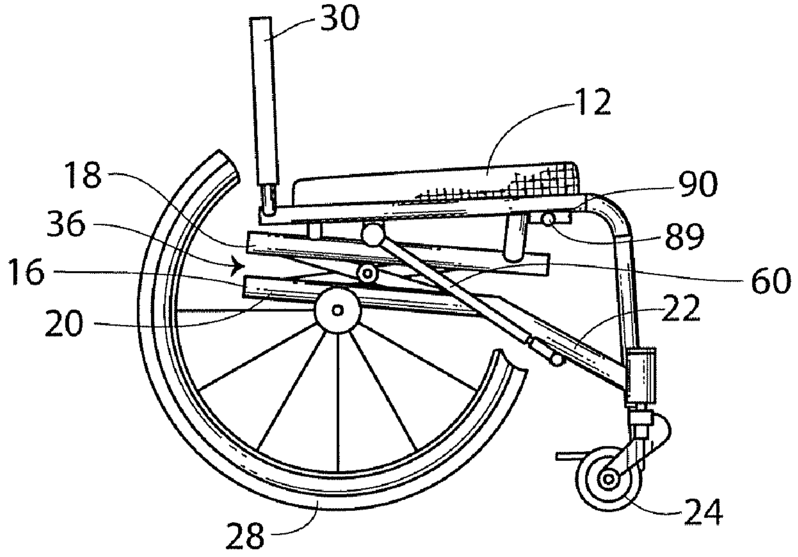
FIG. 4 illustrates a side view of the wheelchair shown in FIG. 1 with the seat in a lowered position.

FIG. 4 illustrates the wheelchair 10 shown in FIG. 1 with the seat 12 moved to a lowered or first position.

Figure 5:
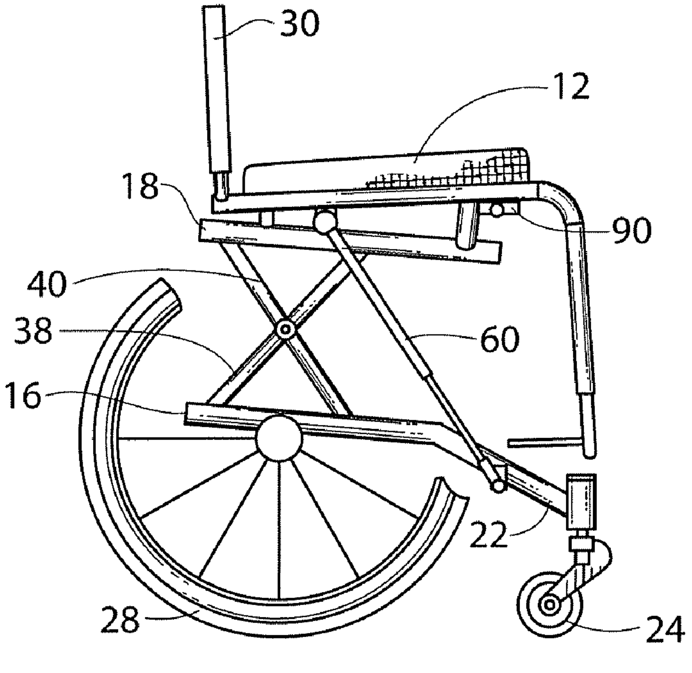
FIG. 5 illustrates a side view of the wheelchair shown in FIG. 1 with the seat in an extended position.

FIG. 5 illustrates the wheelchair 10 with the seat 12 moved to a raised or second position.

Figure 6:
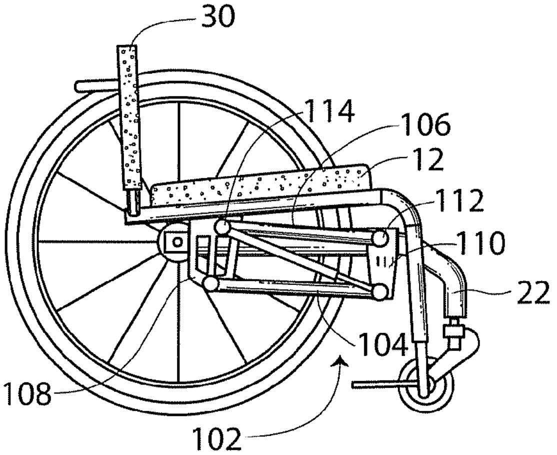
FIG. 6 illustrates an alternate embodiment of the wheelchair with a 4-member pivotable linkage that connects the stability-compensated height-adjustable upper frame of the wheelchair to the lower frame.

FIG. 6 illustrates in side view an alternate embodiment wheelchair 100. The alternate embodiment uses a 4-member pivotably interconnected stability-compensating height-adjusting linkage assembly 102 on opposing sides of the wheelchair 100. Each linkage assembly 102 includes two opposing spaced-apart parallel elongated members 104, 106 and opposing rear and forward end members 108, 110. The opposing end members 108, 110 pivotally connect to opposing ends of the elongated members 104, 106. The linkage assembly 102 has a forward pivot 112 that connects the linkage assembly to the arm 22 of the wheelchair 100. A rear pivot 114 connects the linkage assembly 102 to the upper frame 18. A locking gas spring 116 attaches diagonally to the linkage assembly 102. A first end 118 of the gas spring 116 attaches to a pivot 120 on the linkage assembly 102 opposing the forward pivot 112. A second end 122 pivotably attaches to the rear pivot 114. The gas spring 116 is extendable between a retracted position and an extended position. The gas spring 116 is lockable selectively for holding the gas spring at a selected position.

Figure 7:
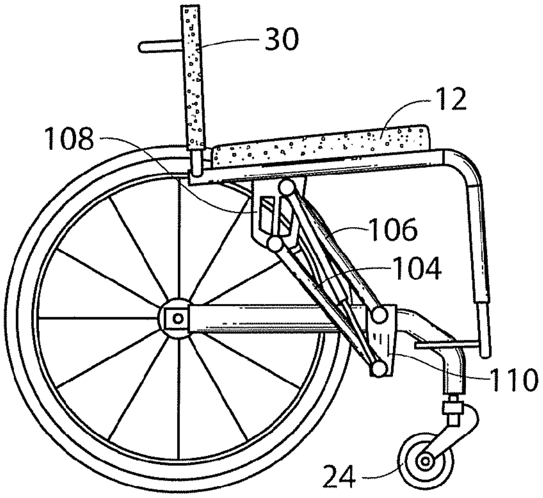
FIG. 7 illustrates the alternate embodiment of the wheelchair shown in FIG. 5 in an extended position that elevates the seat relative to the lower frame.

FIG. 7 illustrates the alternate embodiment wheelchair 100 with the seat 12 moved to a vertically raised or extended position.

Figure 8:
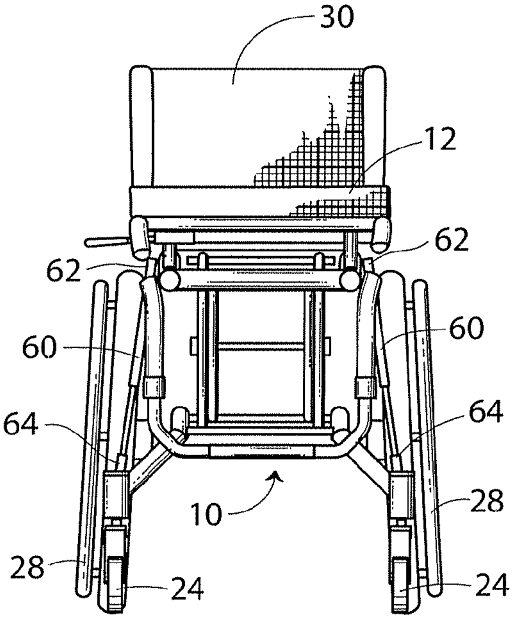
FIG. 8 illustrates a front elevational view of the wheelchair shown in FIG. 1.

FIG. 8 illustrates an alternate embodiment in which the gas springs 60 are positioned so that they are slightly further apart at the bottom end than at the top end. The gas springs 60 thereby are disposed in angled opposing relation with the first ends 62 spaced a first predetermined distance apart and the second ends 64 spaced a second predetermined distance apart, the second predetermined distance greater than the first predetermined distance. This increases the lateral stiffness of the wheelchair 10.

With reference to FIG. 1, the linkage assembly 14 enables the seat 12 of the wheelchair 10 to move relative to the lower frame 14. It is to be appreciated that the footplates 34 move with the seat (or upper frame 18) to maintain the stability of the user's lower legs as well as to prevent pressure on the thighs of the wheelchair user. The pair of locking gas springs 60 provide force that assists the user in adjusting the seat height vertically. The gas springs 60 engaged by the control cables 91 and the lever 89 lock from movement to lock the seat 12 at the selected height. The gas springs 60 when unlocked apply a supplemental force (vertical component) in association with a force applied by the user in the wheelchair to the drive wheels for moving the upper frame 16 relative to the lower frame 14 guided by the linkage assembly 14 that moves pivotingly in response to the applied forces.

The force of the actuators used in the power-supplement manual height-adjusting wheelchair 10 is balanced to match the mass of the user and the seat and upper frame together. The force applied by the gas springs 60 is tuned to be approximately the mass of the user and the seat including the upper frame. In this way, the seat is biased in a first direction for movement and is moveable in a second opposing direction with a force applied by the user to the drive wheels as discussed below, but the force required of the user to move the seat is minimized. The force required to move the seat equals that required to overcome any friction in the mechanism and that required to accelerate the mass of the seat and the user.

With reference to FIG. 3, the height of the seat 12 adjusts by operation of the gas springs 60 and the force applied (if necessary) by the user. Moving the lever 89 unlocks the two gas springs 60. This allows the piston 66 in each of the gas springs 60 to move. The gas springs 60 apply force to move the upper frame 18 (and thus the seat 12) relative to the lower frame 16. In a first embodiment, the vertical force applied by the gas springs 60 totals slightly less than a predetermined load, for example, a load substantially equal to the mass of the user and the seat (and upper frame; for convenience, the discussion below refers to "the seat"). In a second embodiment, the vertical force applied by the gas springs 60 totals slightly more than a predetermined load, for example, a load substantially equal to the mass of the user and the seat.

After the gas springs 60 are unlocked, the gas springs extend. The upper frame 18 moves relative to the lower frame 16. The movement is generally slightly arcuate (upward and forward or downward and rearward), as the linkage member 14 facilitates stability-compensated movement of upper frame (and thus the seat) relative to the lower frame. As the gas springs 60 extend, the force applied by the gas springs changes (slightly lessens). However, the angle of the gas springs 60 relative to vertical also changes. This results in a nearly constant upwards force applied by the gas springs.

The gas springs 60 can be obtained for specific force profiles depending on the configuration of the wheelchair for a particular user. The gas spring 60 produces more force when it is compressed than when extended. The spread in those force differences is designed into the gas spring. This facilitates the initial movement of the seat 12 from the lowered position. The initial force is more than is needed once the seat is moved to the raised position, due the angle of the gas spring as the seat moves. The gas spring 60 accordingly is at a steep angle relative to the direction of movement of the seat to start and the gas spring is more aligned with the direction of seat movement as the gas spring reaches full extension.

The gas springs 60 are thus selected and tuned such that the supplemental vertical force substantially supports the mass of the user (and taking into account the mass of the seat, as well). The force of the actuators are thus balanced relative to gas springs 60 the mass of the user and the seat. The user in the first embodiment must apply a force to move the upper frame upwardly relative to the lower frame and in the second embodiment must apply a force to move the upper frame downwardly relative to the lower frame, as discussed below.

In the first embodiment, the gas springs 60 together apply less vertical force than the mass of the user and the seat. To move the seat upwards, the user grasps the lever 89 with one hand and moves the lever to the second position. This causes the cable 91 to move and unlock the gas springs 60. The user then pushes downwardly with the other hand on the wheel 28. The force applied by the gas springs 60 and the force applied by the user against the wheel 28 moves the seat 12 upwards relative to the lower frame 16. In this embodiment, the vertical force applied by the gas springs 60 is in a range of about 90% to about less than 100% of the predetermined load, for example, the mass of the user and the seat for whom the wheelchair is configured for use. Generally, the vertical force applied by the gas springs is between about 80 and 240 pounds. The gas springs can be selected and tuned for the configuration appropriate for the particular user. Because of the force applied by the gas springs 60, the user need only push with enough force to lift the residual mass of between about 1% and 10% of the user's own weight. However, in an alternate embodiment, the vertical force of the gas spring can be as low as about 80% of the predetermined load, with the user supplying as necessary up to about 20% of the force to move the seat higher. However, an applied force closer to 100% of the predetermined load, for example about 99%, minimizes the force required of the user to move the seat. The wheelchair 10 is "balanced" for the particular user. When the desired height is reached, the user releases the lever 89. This locks the gas springs 60 in place to maintain the seat at the selected height.

The user moves the seat 12 to a lower position by releasing the lever 89 to unlock the gas springs 60. The differential mass of the user relative to force applied by the gas springs then pushes the gas springs 60 to a retracted position, and thereby lowers the seat 12 relative to the lower frame 16. The gas springs 60 are disposed so that the upper frame 18 contacts restingly on the lower frame 16 before the gas springs reach the retraction limit, as shown in FIG. 4. The lower position is for normal everyday use of the wheelchair when the user does not need to use the seat in the raised position as illustrated in FIG. 5.

As the force is being applied, the linkage assemblies move in order to accommodate the change in relative vertical position (and to a lesser extent, the horizontal position) between the seat 12 and the lower frame 16. In the embodiment illustrated in FIG. 1, the guides 70 in the lower frame and 82 in the upper frame move longitudinally. In reference to FIGS. 4 and 5, the guides 70, 82 move from a forward position in which the seat 12 is lowered as shown in FIG. 4 longitudinally on the tracks to the extended position shown in FIG. 5. The respective first and second linkage members 38, 40 pivot at the second ends and relative to each other at the pivot 56 where the linkage members cross. The seat 12 moves along a path approximately 5° from horizontal. This movement allows the seat 12 to translate slightly forward as the height of the seat relative to the lower frame increases. This combination of vertical change in height and horizontal change front-to-back maintains the stability of the chair and prevents the wheelchair from becoming excessively tippy and likely to tip backwards.

With reference to the embodiment illustrated in FIGS. 6 and 7, the wheelchair 100 moves up and slightly forwardly or down and slightly rearwardly in an arcuate path. The parallel elongated members 104, 106 hinge or pivot relative to the rear and forward end members 108, 110 when the gas cylinders 60 are unlocked and the user pushes or pulls on the drive wheel 28.

In the second embodiment, the wheelchair uses gas springs that are tuned or selected to supply a vertical force that exceeds the mass of the user and the seat. This force is sufficient to lift the user and the seat. That is, the vertical force exceeds a predetermined value, for example, the mass of the user and the seat. In this embodiment, the user need not provide additional force to push the seat 12 upwardly. To move upwardly, the user grasps the lever 89 with one hand and moves the lever to the second position. This causes the cable 91 to move and unlock the gas springs 60. The force of the gas springs exceeds the mass of the user and the seat. The upper frame 18 moves upwardly relative to the lower frame 16. At a selected height for the seat 12, the user releases the lever 89 or moves the lever to the first position. This locks the gas springs 60 with the seat 12 at the selected height.

To move downwardly, the user the user grasps the lever 89 with one hand and moves the lever to the second position. This causes the cable 91 to move and unlock the gas springs 60. The user then pulls against the hand rims or wheel 28 in order to lower the seat.

In this second embodiment, the vertical force applied by each of the gas springs 60 equals a second predetermined load that is in a range of about more than 100% to about 110% of the predetermined value. For example, the force is greater than one-half to about 110% of the mass of the user (and seat) for whom the wheelchair is configured for use. Because of the force applied by the gas springs 60, the user need only pull on the wheel 28 with enough force to move between about 1% and 10% of the user's own weight downwardly. Generally, the vertical force applied by the gas springs 60 is between about 80 and 240 pounds. However, in an alternate embodiment, the vertical force of the gas spring can be as high as about 120% of the predetermined load, with the user supplying as necessary about 20% of the force to move the seat vertically lower. However, an applied force closer to 100% of the predetermined load, for example, about 101%, minimizes the force required of the user to move the seat. When the desired height is reached, the user releases the lever 89. This locks the gas springs 60 in place to maintain the selected height.

A limit switch (not illustrated) attached to the wheelchair locks the gas springs against excessive movement. In this embodiment, the limit switch locks the gas springs 60 before the upper frame contacts the lower frame. The upper frame is thus supported by the gas springs 60 instead of resting on the lower frame. This affectivity creates a suspension system arising from the small amount of motion allowed by the springs even when locked.

The apparatus and method disclosed herein can be made and executed without undue experimentation in light of the present disclosure. While the apparatus and methods of this invention have been described in terms of illustrative embodiments, it will be apparent to those of skill in the art that variations may be applied to the apparatus and in the method steps or in the sequence of steps thereof described herein without departing from the concept, spirit and scope of the invention. All such similar substitutes and modifications apparent to those skilled in the art are deemed to be within the spirit, scope and concept of the invention as defined by the appended claims.

What is claimed is:

1. A wheelchair with manual power-supplemented height-adjustable seating, comprising:

a lower frame to which drive wheels attach and opposing forwardly extending arms to which front casters attach for rolling movement across a surface;

an upper frame that includes a seat and backrest for a person to occupy the wheelchair;

a pair of linkage assemblies on opposing sides, each linkage assembly pivotably attached at a first end to the lower frame and at a second end to the upper frame;

a pair of actuators, each pivotally attached at a first end to a rear portion of the upper frame and at an opposing end to a pivot attached to a forward portion of the lower frame, extendable between a retracted position and an extended position, and lockable from moving from a selected position, whereby the actuators when unlocked apply a supplemental vertical force in association with a force applied by a user in the wheelchair on the drive wheels for moving the upper frame relative to the lower frame guided by the linkage assembly pivoting in response to the applied forces.

2. The wheelchair as recited in claim 1, wherein each of the linkage assemblies comprises two opposing spaced-apart parallel elongated members and two opposing end members pivotably connected to opposing ends of the elongated members, the linkage assembly having a forward pivot at a first end that connects the linkage assembly to the lower frame and a rear pivot that connects the linkage assembly to the upper frame.

3. The wheelchair as recited in claim 2, wherein each of the actuators attaches at a first end to a respective one of the linkage assemblies at the forward pivot and at a second end to the rear pivot.

4. The wheelchair as recited in claim 3, wherein the supplemental vertical force applied by the actuators is selected to be in a range of about 90% to about less than 100% of the mass of a user for whom the wheelchair is configured for use.

5. The wheelchair as recited in claim 3, wherein the supplemental vertical force applied by the actuators is selected to be in a range of more than about 100% to about 110% of the mass of a user for whom the wheelchair is configured for use.

6. The wheelchair as recited in claim 1, wherein the supplemental vertical force applied by the actuators is selected to be in a range of about 90% to about less than 100% of the mass of a user for whom the wheelchair is configured for use.

7. The wheelchair as recited in claim 1, wherein the supplemental vertical force applied by the actuators is selected to be in a range of more than about 100% to about 110% of the mass of a user for whom the wheelchair is configured for use.

8. The wheelchair as recited in claim 1, wherein the actuators are selected such that the supplemental vertical force applied by the actuators substantially supports the mass of the user, whereby the user selectively applies a force for moving the upper frame relative to the lower frame.

9. The wheelchair as recited in claim 1, wherein:

the lower frame includes a pair of opposing lower tracks on the sides thereof;

the upper frame includes a pair of upper tracks on the sides thereof and each upper track aligning with a respective one of the lower tracks; and each of the linkage assemblies comprises:

a scissor jack assembly having opposing first and second crossed linkage members on one side and opposing first and second crossed linkage members on an opposing side, the first linkage member on each side pivotably attached at a first end to a rear portion of the lower track on that side and slidably attached at an opposing second end to the upper track on that side and movable relative thereto from first position in a forward portion of the upper track to a second position remote therefrom, the second linkage member on each side pivotably attached at a first end to a rear portion of the upper track on that side and slidably attached at an opposing second end to the lower track on that side and movable relative thereto from first position in a forward portion of the lower track to a second position remote therefrom, the first linkage member and the second linkage member on each side pivotally connected at respective medial portions.

10. The wheelchair as recited in claim 9, wherein the supplemental vertical force applied by the actuators is selected to be in a range of about 90% to about less than 100% of the mass of a user for whom the wheelchair is configured for use.

11. The wheelchair as recited in claim 9, wherein the supplemental vertical force applied by the actuators is selected to be in a range of more than about 100% to about 110% of the mass of a user for whom the wheelchair is configured for use.

12. The wheelchair as recited in claim 9, wherein the actuators are selected such that the supplemental vertical force applied by the actuators substantially supports the mass of the user, whereby the user selectively applies a force for moving the upper frame relative to the lower frame.

13. The wheelchair as recited in claim 9, wherein the lower track and upper track each define a slot that extends from a forward portion to an intermediate portion; and further comprising a plurality of guides, one guide attached to a respective second end of linkage members, the guide engaged to the slot for movement therewith when the actuators are released from the selected locked position.

14. The wheelchair as recited in claim 1, wherein the actuators are disposed in angled opposing relation with the first ends spaced a first predetermined distance apart and the second ends spaced a second predetermined distance apart, the second predetermined distance greater than the first predetermined distance.

15. A wheelchair with manual power-supplemented height-adjustable seating, comprising:

a lower frame to which drive wheels attach and opposing forwardly extending arms to which front casters attach for rolling movement across a surface, and including a pair of opposing lower tracks on the sides thereof;

an upper frame that includes a seat and backrest for a person to occupy the wheelchair, and including a pair of opposing upper tracks on the sides thereof, the upper track on each side aligning with a respective one of the lower tracks;

a scissor jack assembly having opposing first and second crossed linkage members on one side and opposing first and second crossed linkage members on an opposing side, the first linkage member on each side pivotably attached at a first end to a rear portion of the lower track on that side and slidably attached at an opposing second end to the upper track on that side and movable relative thereto from first position in a forward portion of the upper track to a second position remote therefrom, the second linkage member on each side pivotably attached at a first end to a rear portion of the upper track on that side and slidably attached at an opposing second end to the lower track on that side and movable relative thereto from first position in a forward portion of the lower track to a second position remote therefrom, the first linkage member and the second linkage member on each side pivotally connected at respective medial portions;

a pair of power cylinders, each attached at a first end to a respective one of the arms extending forwardly on the lower frame and attached at a second end to a portion of a respective one of the upper tracks, extendable between a retracted position and an extended position, and selectively lockable at a selected position;

the power cylinder when unlocked applies a supplemental vertical force in association with a force applied by the user in the wheelchair for moving the upper frame relative to the lower frame.

16. The wheelchair as recited in claim 15, wherein the supplemental vertical force applied by the power cylinders is selected to be less than about 100% of the mass of a user for whom the wheelchair is configured for use.

17. The wheelchair as recited in claim 15, wherein the supplemental vertical force applied by the power cylinders is selected to be in a range of about 90% to about less than 100% of the mass of a user for whom the wheelchair is configured for use.

18. The wheelchair as recited in claim 15, wherein the supplemental vertical force applied by the power cylinders is selected to be more than about 100% of the mass of a user for whom the wheelchair is configured for use.

19. The wheelchair as recited in claim 15, wherein the supplemental vertical force applied by each of the actuators is selected to be in a range of more than about 100% to about 110% of the mass of a user for whom the wheelchair is configured for use.

20. The wheelchair as recited in claim 15, wherein the lower track and upper track each define a slot that extends from a forward portion to an intermediate portion; and further comprising a plurality of guides, one guide attached to a respective second end of linkage members, the guide engaged to the slot for movement therewith when the power cylinder is released from the selected locked position.

21. The wheelchair as recited in claim 15, wherein the power cylinders are disposed in angled opposing relation with the first ends spaced a first predetermined distance apart and the second ends spaced a second predetermined distance apart, the second predetermined distance greater than the first predetermined distance.

22. A wheelchair with height-adjustable seating, comprising:

a lower frame to which drive wheels attach and opposing forwardly extending arms to which front casters attach for rolling movement across a surface;

an upper frame that includes a seat and backrest for a person to occupy the wheelchair;

a pair of linkage assemblies on opposing sides, each linkage assembly including two opposing spaced-apart parallel elongated members and two opposing end members pivotably connected to opposing ends of the elongated members, the linkage assembly having a forward pivot that connects the linkage assembly to a respective one of the arms and a rear pivot that connects the linkage assembly to the upper frame;

a pair of power cylinders, each attached to a respective one of the linkage assemblies at a first end to a pivot opposing the forward pivot and at a second end to the rear pivot, extendable between a retracted position and an extended position, and lockable from moving at a selected position;

the power cylinder when unlocked applies a supplemental vertical force in association with a force applied by a user in the wheelchair to the drive wheels for moving the upper frame relative to the lower frame guided by the linkage assembly pivoting in response to the applied forces.

23. The wheelchair as recited in claim 22, wherein the supplemental vertical force applied by the power cylinders is selected to be in a range of about 90% to about less than 100% of the mass of a user for whom the wheelchair is configured for use.

24. The wheelchair as recited in claim 22, wherein the supplemental vertical force applied by the power cylinders is selected to be in a range of more than about 100% to about 110% of the mass of a user for whom the wheelchair is configured for use.

25. The wheelchair as recited in claim 22, wherein the power cylinders are disposed in angled opposing relation with the first ends spaced a first predetermined distance apart and the second ends spaced a second predetermined distance apart, the second predetermined distance greater than the first predetermined distance.

26. A method of moving a seat vertically in a wheelchair having a lower frame to which drive wheels attach and opposing forwardly extending arms to which front casters attach for rolling movement across a surface, an upper frame that includes a seat and backrest for a person to occupy the wheelchair, comprising the steps of:

(a) providing a pair of linkage assemblies on opposing sides, each linkage assembly pivotably attached at a first end to the lower frame and at a second end to the upper frame;

(b) releasing from selected locked position a pair of power cylinders that extend between a retracted position and an extended position, each power cylinder attached at a first end to a rear portion of the upper frame and at an opposing end to a pivot associated with a forward portion of the lower frame, the power cylinders upon release applying a supplemental force between the upper frame and the lower frame; and (c) a user seated in the wheelchair applying a force relative to the drive wheels to move the seat vertically relative to the lower frame in the presence of the supplemental force from the power cylinders.

27. The method as recited in claim 26, wherein each if the power cylinders applies a supplemental vertical force selected to be in a range of about 90% to about less than 100% of the mass of a user for whom the wheelchair is configured for use.

28. The method as recited in claim 26, wherein each of the power cylinders applies a supplemental vertical force selected to be in a range of more than about 100% to about 110% of the mass of a user for whom the wheelchair is configured for use.

29. The method as recited in claim 26, further comprising disposing the power cylinders in angled opposing relation with the first ends spaced a first predetermined distance apart and the second ends spaced a second predetermined distance apart, the second predetermined distance greater than the first predetermined distance.

* * * * *